H. P. HERRON.
HOSE WASHER.
APPLICATION FILED DEC. 10, 1909.

1,157,536.

Patented Oct. 19, 1915.

Witnesses:
Louis W Gratz
Peter S. Alter

Inventor
Harry P. Herron.
by Tomumo Lyon & Hackley.
his Attys.

UNITED STATES PATENT OFFICE.

HARRY P. HERRON, OF LOS ANGELES, CALIFORNIA, ASSIGNOR TO H. MUELLER MANUFACTURING COMPANY, OF DECATUR, ILLINOIS, A CORPORATION OF ILLINOIS.

HOSE-WASHER.

1,157,536.

Specification of Letters Patent.

Patented Oct. 19, 1915.

Application filed December 10, 1909. Serial No. 532,478.

*To all whom it may concern:*

Be it known that I, HARRY P. HERRON, a citizen of the United States, residing in Los Angeles, county of Los Angeles, State of California, have invented a new and useful Hose-Washer, of which the following is a specification.

The object of my invention is to provide a washer for hose couplings which will afford a perfect packing between the two members of the hose coupling when the same are screwed together, and which will not be liable to fall out or become displaced when the male member is unscrewed from the female member of the coupling.

The accompanying drawings illustrate my invention—

Figure 1:
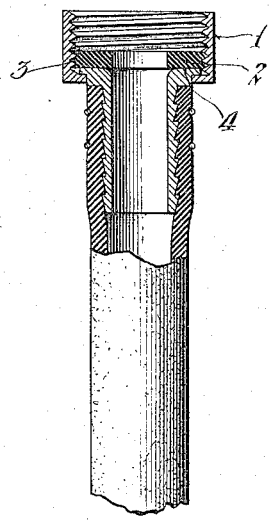
Figure 2:
Figure 4:
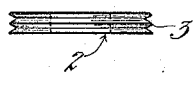
Figure 3:
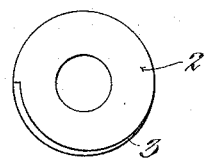

Figure 1, is a view showing a female member of a hose coupling in section with my washer in place; Fig. 2, is a side elevation of the preferred form of my invention; Fig. 3, is a plan of the form shown in Fig. 2; Fig. 4, is another form of the invention.

1 is the female member of a hose coupling, 2 is my improved washer which is made preferably from resilient material such as india rubber vulcanized to the desired degree of hardness, 3 indicates peripheral corrugations around the washer body, and 4 is a shoulder in the hose coupling.

In manufacturing washers according to my invention I prefer to employ a hollow bar of elastic material such as vulcanized rubber of the desired diameter and having a perforation suitable to be cut into washers of the proper thickness. Such bar is placed in a lathe or other suitable machine and the same is indented or cut to form the corrugations 3 in the periphery of the washers. These corrugations may be made in any desired manner by cutting or indenting the surface of the bar and may be formed spirally around the bar or may be formed parallel with each other as indicated in Fig. 4. I prefer to form the corrugations spirally as shown in Fig. 2 and when so formed, and the washer is seated within the hose coupling member 2, the corrugations will register with the threads of the hose coupling member and prevent its displacement. When the washer is provided with parallel corrugations as shown in Fig. 4, the corrugations will cross the threads of the hose member and the threads of the hose member will indent the corrugations in crossing the same, it being remembered that the washer 2 being of a resilient nature will press outwardly and fill the threads and form a tight packing when the male member of the coupling is screwed down upon the washer.

In use, the washer will be inserted within the hose coupling member 2 and will be seated in the ordinary manner, after which the other hose member will be screwed into the member 2 and against the washer which will cause the corrugations on the washer to firmly engage with the threads in the hose coupling member and be retained within such member when the male member is unscrewed from the female member. In placing the washer within the hose coupling member, the same may be pushed inward by the operator until the same is seated, or when the form shown in Fig. 2 is employed, the same may be run down in the threads of the female member until the same is seated.

What I claim is:

1. As a new article of manufacture, a self-retaining hose washer formed of flexible, elastic, and resilient material; said washer having therethrough a central opening, and provided on its external periphery with a plurality of integral corrugations throughout the length of the washer, forming a series of thin, highly flexible projections to engage the threads of a hose coupling.

2. As a new article of manufacture, a self-retaining hose washer formed of flexible, elastic, and resilient material; said washer having therethrough a central opening, and provided on its external periphery with a plurality of integral, continuous corrugations which encircle the periphery throughout the length of the washer and form a series of thin, highly flexible projections to engage the threads of a hose coupling.

3. As a new article of manufacture, a self-retaining hose washer formed of flexible, elastic, and resilient material; said washer having therethrough a central opening, and provided on its external periphery with a plurality of integral, continuous corrugations formed by a continuous spiral which runs from one end of the washer to the other and forms a series of thin, highly-flexible projections adapted to make threaded engagement with the screw threads of a hose coupling when the washer is forced or screwed into place in a coupling.

In testimony whereof, I have hereunto set my hand at Los Angeles, California, this 2nd day of December, 1909.

HARRY P. HERRON.

Witnesses:
F. M. TOWNSEND,
FRANK L. A. GRAHAM.

Copies of this patent may be obtained for five cents each, by addressing the "Commissioner of Patents, Washington, D. C."